(12) United States Patent
Hauck et al.

(10) Patent No.: US 6,364,184 B1
(45) Date of Patent: Apr. 2, 2002

(54) ADAPTER FOR REMOVABLY HOLDING A CELLULAR PHONE ON A BELT CLIP

(75) Inventors: Peter Hauck, Steinhagen; Thomas Maciejowski, Werther; Michael Stumpf, Bielefeld; Rainer Süssenbach, Steinhagen, all of (DE)

(73) Assignee: Bollhoff GmbH, Bielefeld (DE)

( * ) Notice: Subject to any disclaimer, the term of this patent is extended or adjusted under 35 U.S.C. 154(b) by 0 days.

(21) Appl. No.: 09/611,044

(22) Filed: Jul. 6, 2000

(30) Foreign Application Priority Data

Jul. 7, 1999 (DE) .......................... 199 31 338

(51) Int. Cl.[7] .................................................. A45F 5/00
(52) U.S. Cl. ........................ 224/271; 224/197; 224/930
(58) Field of Search ................................. 224/197, 271, 224/272, 553, 929, 930; 379/446, 454; 455/100; 248/223.41, 224.51, 224.61

(56) References Cited

U.S. PATENT DOCUMENTS

| | | | | |
|---|---|---|---|---|
| 3,881,677 A | * | 5/1975 | Ihlenfeld | |
| 4,214,688 A | * | 7/1980 | Griffin, Jr. | .................. 224/197 |
| 5,014,892 A | * | 5/1991 | Copeland | |
| 5,392,350 A | * | 2/1995 | Swanson | ..................... 379/446 |
| 5,540,368 A | * | 7/1996 | Oliva | ......................... 224/271 |
| 5,622,296 A | * | 4/1997 | Pirhonen et al. | ............ 224/197 |
| 5,730,342 A | * | 3/1998 | Tien | ........................... 224/271 |
| 5,850,996 A | * | 12/1998 | Liang | ..................... 224/197 X |

FOREIGN PATENT DOCUMENTS

| | | |
|---|---|---|
| DE | 19600496 | 7/1997 |
| DE | 19708120 | 2/1998 |
| DE | 29614058 | 2/1998 |

* cited by examiner

Primary Examiner—Gregory M. Vidovich
(74) Attorney, Agent, or Firm—Seyfarth Shaw

(57) ABSTRACT

An adapter for removably holding a cellular phone on a belt clip to be secured to a belt. The adapter comprises a mounting portion adapted to be mounted to the cellular phone, a holding portion adapted to be received in a U-shaped seat of the belt clip, and a connecting portion between said mounting and holding portions. The connecting portion comprises a hinge means enabling pivotal movements of said holding portion relative to said mounting portion. Due to this structure inadvertent pivotal movements of the cellular phone relative to the belt clip secured to the belt do not result in the adapter being broken off of the cellular phone causing damages to or even destruction of the cellular phone.

9 Claims, 3 Drawing Sheets

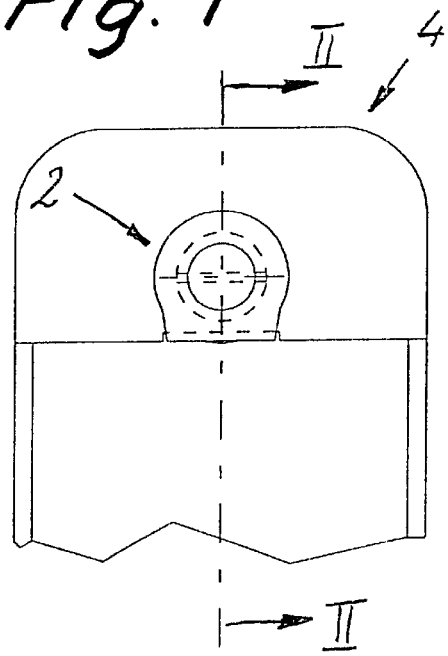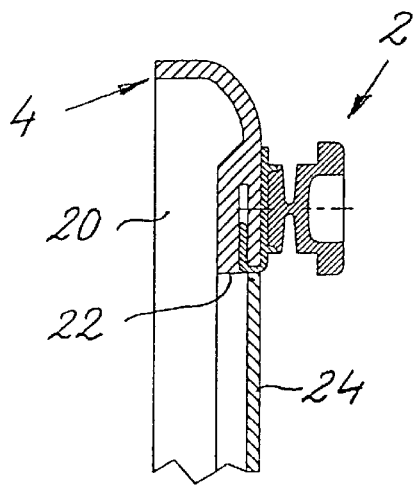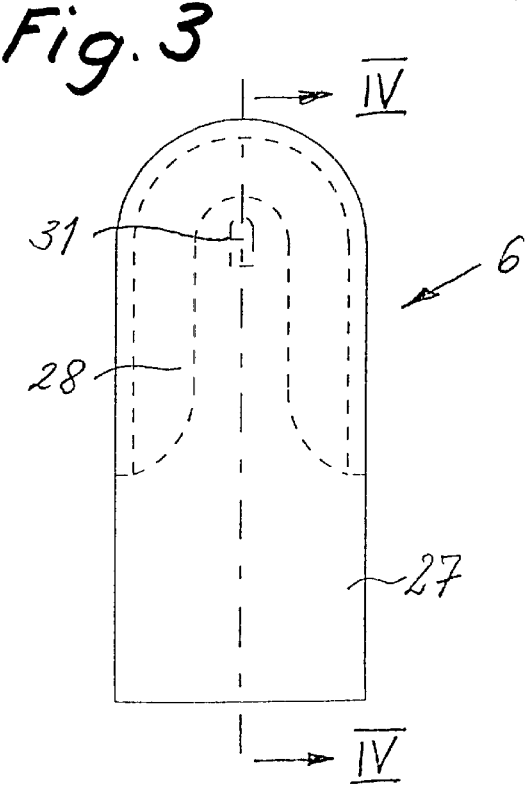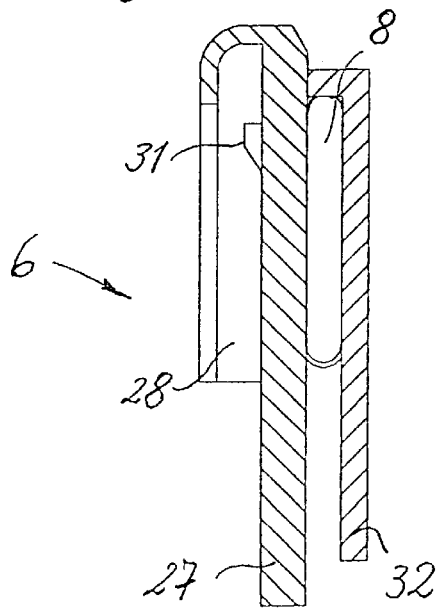

ADAPTER FOR REMOVABLY HOLDING A CELLULAR PHONE ON A BELT CLIP

BACKGROUND OF THE INVENTION

1. Field of the Invention

This invention relates to cellular phones and in particular to an adapter for removably holding a cellular phone on a belt clip.

2. Description of the Prior Art

A prior art adapter for removably holding a cellular phone on a belt clip comprises a mounting portion adapted to be mounted to the cellular phone, a holding portion adapted to be received in a U-shaped seat of the belt clip, and a connecting portion between the mounting and holding portions.

In this prior adapter the mounting portion has in integral hook adapted to be inserted into the battery opening of the cellular phone and to be fixed therein by the cover for closing the battery opening. The mounting portion comprises a round button-like part adapted to be inserted into the U-shaped seat of the belt clip, and to be secured therein by a catch. The belt clip can be secured to the belt of a person. This allows to mount the adapter including the cellular phone to the belt of this person.

The prior adapter including its mounting, holding and connecting portions is an integral member of hard plastics material so as to provide for a rigid connection between the belt and the cellular phone. However, there is a certain risk that inadvertent pivotal movements of the cellular phone relative to the belt clip, for example when the person carrying the cellular phone sits down, will cause the adapter to be broken off of the housing of the cellular phone. As a result thereof the housing of the cellular phone and therefore the cellular phone itself cannot be used anymore.

SUMMARY OF THE INVENTION

It is a general object of the invention to provide an improved adapter which avoids the disadvantages of the prior adapters as described above.

An important feature of the invention is the provision of an adapter of the type set forth, which avoids or at least minimizes the risk of damaging or destroying the cellular phone by inadvertent pivotal movements of the cellular phone relative to the belt clip.

Another feature of the invention is the provision of an adapter which is of relatively simple and economical construction.

These and other features of the invention are attained by providing an adapter having a connecting portion which comprises a hinge means enabling pivotal movements of the holding portion relative to the mounting portion thereof. The hinge means allows for relatively substantial pivotal movements between the cellular phone and the belt clip while avoiding the risk of the adapter being broken off of the housing of the cellular phone.

The hinge means can be a conventional hinge having male and female parts. Preferably, however, the hinge means comprises a resilient material section integral with the remaining material of said connecting portion. Preferably, said resilient material section comprises an area of reduced cross-section of said connecting portion. Due to this structure the adapter is of extremely simple and economical construction.

It is preferred that the adapter is made of two members, i.e. a member of relatively stiff material comprising the mounting portion and a second member of relatively flexible material forming the remainder of the adapter and including the hinge means. Due to this structure the adapter is safely secured to the cellular phone whiie at the same time substantial pivotal movements between the cellular phone and the belt clip are possible.

BRIEF DESCRIPTION OF THE DRAWINGS

For the purpose of facilitating and understanding the invention, there are illustrated in the accompanying drawings preferred embodiments thereof, from an inspection of which, when considered in connection with the following description, the invention, its construction and operation, and many of its advantages should be readily understood and appreciated.

FIG. 1 is a partial top plan view of a cellular phone including an adapter;

FIG. 2 is a sectional view taken generally along the line II—II in FIG. 1;

FIG. 3 is a reduced top plan view of a belt clip;

FIG. 4 is a sectional view generally along the line IV—IV in FIG. 3;

DETAILED DESCRIPTION OF THE PREFERRED EMBODIMENTS

Figure 6:
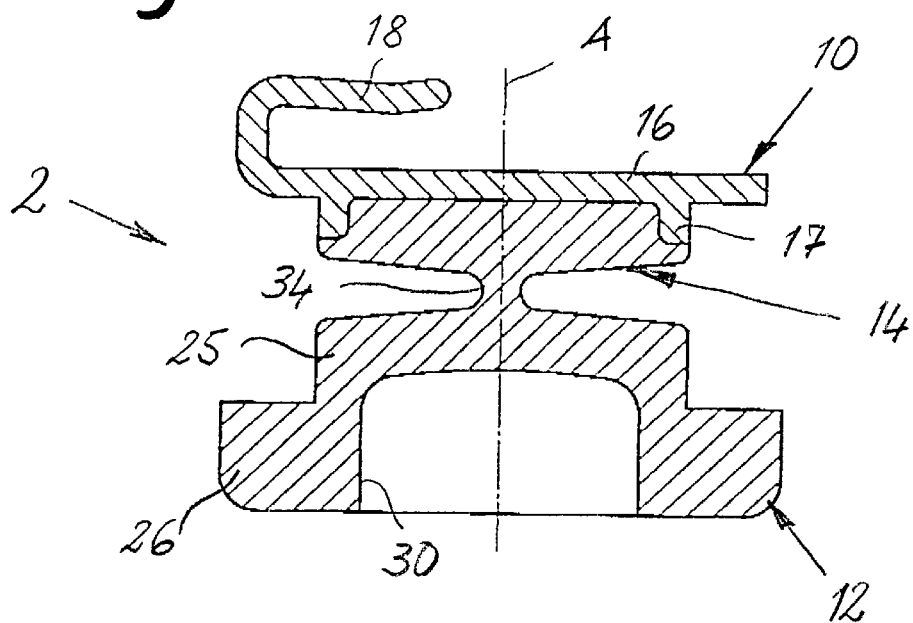
FIG. 6 is a sectional view generally along the line VI—VI in FIG. 5.
Figure 5:
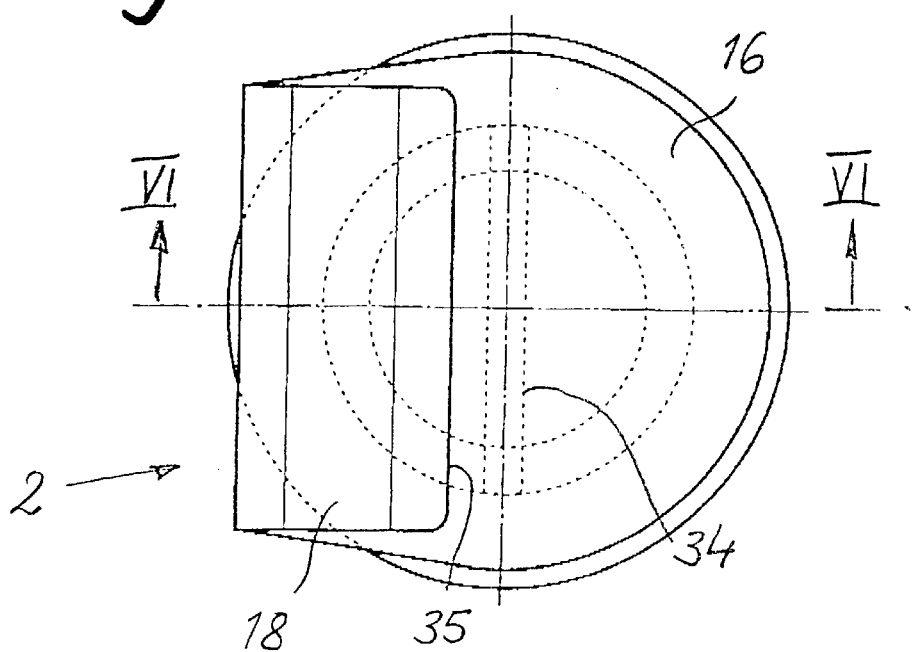
FIG. 5 is an enlarged bottom plan view of the adapter in FIGS. 1 and 2.

An adapter 2 as shown in FIG. 2 and FIGS. 5 and 6 is used to removably mount a cellular phone 4 (FIGS. 1, 2) to a belt clip 6 (FIGS. 3, 4). The belt clip 6 can be attached to a belt 8 carried by a person, as schematically indicated in FIG. 4.

The adapter 2 comprises a mounting portion 10 to be mounted to the cellular phone 2, a holding portion 12 to be attached to the belt clip 6, and a connecting portion 14 integrally connecting the mounting portion 10 to the holding portion 12.

The mounting portion 10 comprises a plate-like member 16 having an extension shaped as a hook 18. As indicated in FIG. 2, the hook 18 is inserted into a battery opening 22 of a housing 20 of the cellular phone and is secured therein by a cover 24 for closing the battering opening 22. As a result thereof the adapter 2 is removably attached to the housing 20 of the cellular phone. The plate-like member 16 has, at its side remote from the hook 18, an annular projection 17 which is used to connect the plate-like member 16 to the remainder of the adapter 2 as will be explained in more detail below.

The holding portion 12 comprises a round button-like member symmetrical with respect to an axis A and having a cylindrical portion 25 of smaller diameter and a cylindrical portion 26 of greater diameter. As indicated in FIGS. 3 and 4, the belt clip 6 comprises a plate-like member 27 having an U-shaped seat 28 adapted to receive the greater diameter portion 26 of the holding portion 12. The holding portion 12 has a recess 30 to be engaged by a catch 31 of the belt clip 6 in order to secure the adapter 2 and therefore the cellular phone on the belt clip 6. The plate-like member 27 of the belt clip 6 has a resilient clip portion 32 for attaching the belt clip 6 to the belt 8 as schematically indicated in FIG. 4.

The connection portion 14 comprises a hinge means 34 enabling pivotal movements of the holding portion 12 relative to the mounting portion 10 so as to allow for pivotal movements of the cellular phone 4 relative to the belt clip 6 attached to the belt 8. In the embodiment of FIGS. 5 and 6 the hinge means 34 is formed by an area of the connecting portion 14 of reduced cross-section, i.e. by a material portion which is integral with the material of the remainder of the connecting portion 14. As indicated in FIG. 5 by dotted lines, the area of reduced cross-section forming the hinge means 34 comprises a narrow web extending perpendicularly to the axis A and in parallel relationship to the terminal edge 35 of the hook 18. The hinge means 34 enables pivotal movements between the mounting portion 10 and the holding portion 12 essentially about an axis which is perpendicular to the axis A and parallel to the terminal edge 35 of the hook 18.

Alternatively, the material portion forming the hinge means 34 could be designed so as to be symmetrical with respect to axis A so as to enable universal pivotal movements between the mounting portion 10 and the holding portion 12. As a further alternative, the hinge means 34 could be comprised of two members forming a conventional hinge or universal joint.

As should be clear from the above description and in particular FIG. 6, the adapter 2 is comprised of two members, i.e. the plate-like member 16 of the mounting portion 10 and the integral remainder of the adapter 2 which comprises the holding portion 12 and the connecting portion 14. Preferably the plate-like member 16 is made of a relatively stiff material while the remainder of the adapter 2 is made of a relatively resilient material which provides for the required resiliency of the hinge means 34. The relatively stiff material is preferably a hard plastics material, in particular a high strength thermoplastic material re-enforced by a filler. The thermoplastic material can be for example polyamide, polypropylene or polyester, while the filler preferably comprises glass fibres, carbon fibres or the like.

The remainder of the adapter 2 comprising the holding portion 12 and the connecting portion 14 is preferably made of a thermoplastic elastomeric or rubber material, for example a thermoplastic polyurethane (PUR), a polyester elastomeric material or a impact-resistant modified thermoplastic material.

Figure 7:
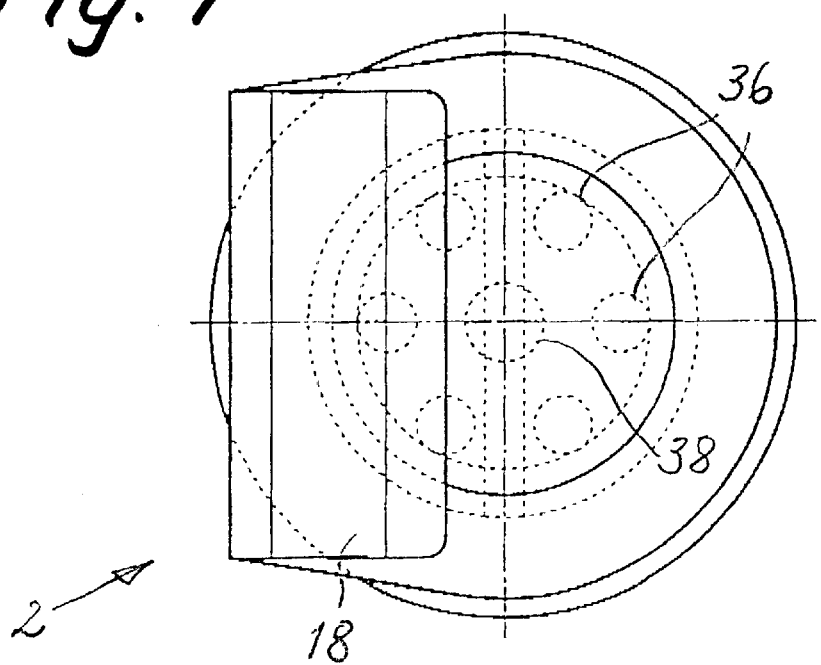

For manufacturing the adapter 2 shown in FIGS. 6 and 7 a hard plastics material is injection molded, as mentioned above, for example at temperatures between 250 and 260° C., to form the plate-like member 16 including the hook 18 and the as annular projection 17. Thereafter, the elastomeric material having a melting temperature of less than 250° C. is adhered to the plate-like member 16 by injection molding thereof at a temperature above the melting temperature of the hard plastics material of the plate-like member 16. As a result thereof, the material of the plate-like member 16 in the area within the annular projection 17 is molten at its surface so that the hard plastics material of the plate-like member 16 and the elastomeric material of the connecting portion 14 and the holding portion 12 will be interlinked. As a result thereof, the adapter 2 will be comprised, on the one hand, of a relatively hard material for safe connection to the cellular phone 2, and, on the other hand, of a relatively deflectable material for providing the required resiliency of the hinge means 34 while at the same time both materials are integrally connected to each other.

Figure 8:
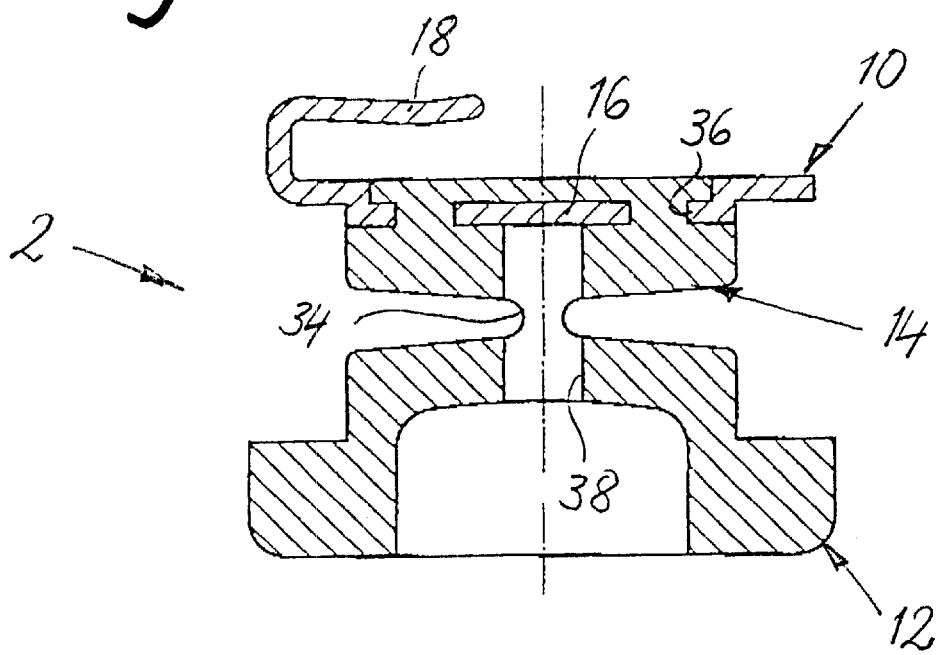
FIGS. 7 and 8 are views similar to FIGS. 5 and 6 of a modified adapter.

The modified embodiment of adapter 2 shown in FIGS. 7 and 8 substantially corresponds to the adapter shown in FIGS. 5 and 6; therefore the same reference numerals have been used for similar components.

The embodiment of FIGS. 7, 8 differs from the embodiment of FIGS. 5, 6 substantially only in that the plate-like member 16 of the mounting portion 10 is not made of plastics material, but rather of sheet metal, in particular steel. The plate-like member 16, in this case, has a plurality of holes 36, which enable to positively connect the plate-like member 16 to the remainder of the adapter 2 which, as in the embodiment of FIGS. 5 and 6, is made of a thermoplastic elastomeric or rubber material.

For manufacturing the adapter 2 shown in FIGS. 7 und 8, initially the plate-like member 6 including the hook 18 and the holes 36 is formed of sheet metal. Thereafter, the thermoplastic elastomeric material is adhered to the plate-like member 16 by injection molding of material into the holes 36 and about the plate-like member 16; an aperture 38 within adapter 2 serves to support the plate-like member 16 during the injection molding process. Again, the plate-like member 16 will be securely connected to the remainder of the adapter 2.

While particular embodiments of the present invention have been shown and described, it will be appreciated by those skilled in the art that changes and modifications may be made without departing from the invention in its broader aspect. Therefore, the aim in the appending claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An adapter for removably holding a cellular phone on a belt clip, said adapter comprising a mounting portion adapted to be mounted to the cellular phone, a holding portion comprising a round member having a first cylindrical portion of smaller diameter and a second cylindrical portion of greater diameter than said first portion adapted to be received in a U-shaped seat of said belt clip so as to be rotatable therein, and a connecting portion between said first cylindrical portion of smaller diameter of said holding portion and said mounting portion, said connecting portion comprising a hinge means enabling pivotal movements of said holding portion relative to said mounting portion.

2. The adapter of claim 1, wherein said hinge means comprises a resilient material section integral with the remaining material of said connecting portion.

3. The adapter of claim 2, wherein said resilient material section comprises an area of reduced cross-section of said connecting portion.

4. The adapter of claim 3, wherein said holding portion and at least a part of said connecting portion are symmetrical with respect to a common axis, and said area of reduced cross-section comprises a narrow web extending transverse to said axis.

5. The adapter of claim 1, wherein said mounting portion comprises a plate-shaped member having a hook portion adapted to be inserted into a housing of the cellular phone, and said plate-shaped member is fixedly secured to the remainder of the adapter which is an integral one-piece part.

6. The adapter of claim 1, wherein said mounting portion is made of a relatively stiff material and the remainder of the adapter is made of a relatively resilient material.

7. The adapter of claim 5, wherein said plate-shaped member of said mounting portion is made of hard plastics material and the remainder of the adapter is made of an elastomeric or rubber material, cross-linked with said hard plastics material.

8. The adapter of claim 7, wherein said hard plastics material is a high strength thermoplastic material enforced by a filler.

9. The adapter of claim 5, wherein said plate-shaped member of said mounting portion is made of sheet metal and the remainder of the adapter is made of an elastomeric or rubber material positively connected to said sheet metal by injection molding.

* * * * *